(12) United States Patent
Specht

(10) Patent No.: US 6,502,861 B2
(45) Date of Patent: Jan. 7, 2003

(54) SEAT BELT GUIDE

(75) Inventor: Martin Specht, Feldafing (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 5 days.

(21) Appl. No.: 09/767,029

(22) Filed: Jan. 22, 2001

(65) Prior Publication Data
US 2002/0017781 A1 Feb. 14, 2002

(30) Foreign Application Priority Data
Apr. 25, 2000 (DE) .......................... 100 20 246

(51) Int. Cl.$^7$ .......................... B60R 22/00; A44B 11/10
(52) U.S. Cl. .......................... 280/808; 24/97
(58) Field of Search .................. 280/808, 801.1, 280/801.2; 297/482, 483; 24/633, 97, 182, 464, 483, 265 BC

(56) References Cited

U.S. PATENT DOCUMENTS

| | | | |
|---|---|---|---|
| 3,959,855 A | | 6/1976 | Fisher .......................... 24/163 |
| 4,527,313 A | * | 7/1985 | Sylven et al. ........... 24/265 BC |
| 4,642,853 A | * | 2/1987 | Plesniarski et al. ........ 24/163 R |
| 5,257,820 A | * | 11/1993 | Kosugi ...................... 24/163 R |
| 5,513,880 A | * | 5/1996 | Ohira et al. ................. 280/808 |
| 5,601,311 A | * | 2/1997 | Pfeiffer et al. ........... 280/801.1 |
| 6,138,328 A | * | 10/2000 | Iseki ........................... 24/197 |
| 6,315,328 B1 | * | 11/2001 | Iseki et al. .................. 280/808 |

FOREIGN PATENT DOCUMENTS

| | | |
|---|---|---|
| DE | 2825548 | 12/1979 |
| DE | 3318849 | 12/1983 |
| DE | 3328271 | 2/1985 |
| DE | 3427757 | 2/1985 |
| DE | 8611961 | 9/1986 |
| DE | 19940852 | 3/2000 |
| EP | 0689973 | 1/1996 |
| GB | 2144971 | 3/1985 |

* cited by examiner

Primary Examiner—Paul N. Dickson
Assistant Examiner—David R. Dunn
(74) Attorney, Agent, or Firm—Lonnie Drayer; Jarett Rieger

(57) ABSTRACT

A seat belt guide has a metallic body for mounting on a vehicle structure. A flexing bar has a low-friction belt webbing guide face around which webbing of a seat belt is guided. The flexing bar and two flexing bar carriers define a webbing guide aperture. A belt webbing guide face is formed by a sliding shell that is clipped on with an interlocking fit in the region of the flexing bar and the flexing bar carriers.

11 Claims, 3 Drawing Sheets

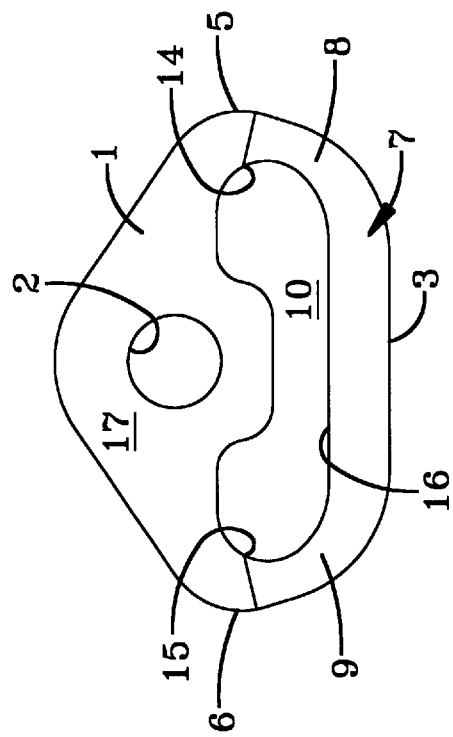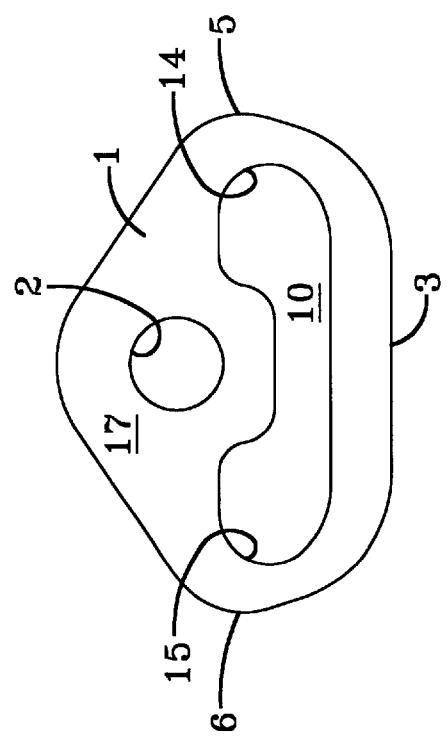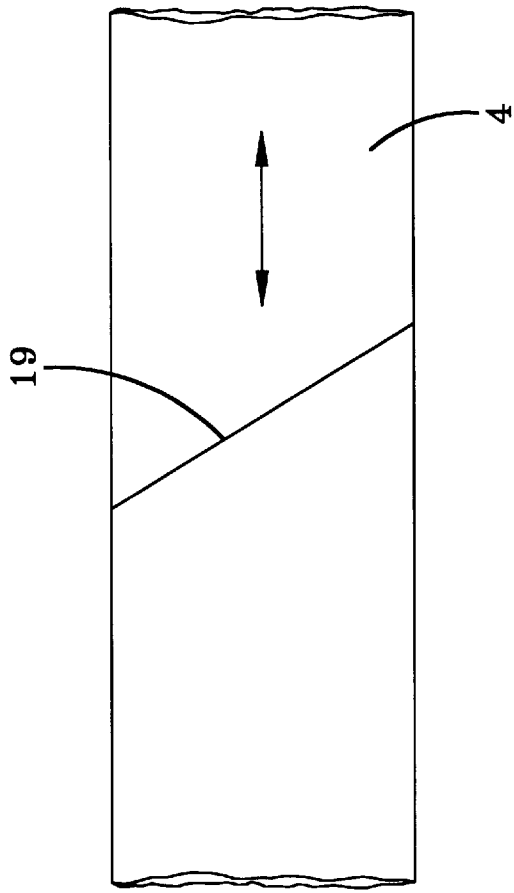

SEAT BELT GUIDE

FIELD OF THE INVENTION

The present invention relates to a seat belt guide.

DISCUSSION OF THE PRIOR ART

A seat belt guide of the type known from DE 199 40 852 A1 has a low friction material provided on a flexing bar in the region of a belt webbing guide face. The guide body can be produced from a metal plate by pressing and has a flexing bar with a substantially C-shaped cross-section. The flexing bar is connected to an anchoring plate via flexing bar carriers leaving a relatively narrow belt webbing guide aperture. The belt webbing guide face on the flexing bar has low friction, provided for example by a single or multi-layer plating or galvanizing or by a multi-layer coating with solid lubricating properties. This surface treatment is relatively expensive.

SUMMARY OF THE INVENTION

There is provided in accordance with the present invention a seat belt guide with low friction in the region of the belt webbing guide face of the flexing bar. A sliding shell made of a low friction material is placed on the belt webbing guide face of the flexing with an interlocking fit and over the two faces of the transition points between the flexing bar and flexing bar carrier and, if necessary, at least partially over the flexing bar carrier. The sliding shell, which can be a plastic clip, has a wall thickness of the order of about 0.4 mm to 0.6 mm. The inner contour of the sliding shell rests with an interlocking fit on the surface of the metallic flexing bar and forms the low-friction belt webbing guide face of the guide in the belt guide aperture of the metallic guide body. The adhesive force with which the sliding shell is clipped with an interlocking fit on the flexing bar is dimensioned such that it can diminish the forces that occur at least during normal belt retractor operation. The two lateral edges of the sliding shell preferably project beyond the two rounded regions of the transition points of the flexing bar carrier extending vertically with respect to the flexing bar. As a result there is achieved, at the two ends of the sliding shell, a flanging over the two laterally rounded-off regions of the sliding shell, which laterally define the belt webbing guide aperture. As a result the sliding shell is fixed in all directions. Vertical and/or horizontal movement of the sliding shell on the metallic guide body is therefore prevented. The sliding shell defines the belt webbing guide aperture in the guide body in the regions in which the seat belt webbing is guided and deflected around. With a three point seat belt system, the guide forms the upper guide point of the webbing, lying above the shoulder of the vehicle occupant. During retraction and extraction of the seat belt an ideal sliding surface is achieved without any friction or friction angle contours, in particular due to the flanging of the sliding shell ends in the lateral rounded parts of the belt webbing guide aperture. Even with oblique extraction of the seat belt, there is no danger of the edges of the seat belt webbing catching with high friction in the corner contours or other contours of the guide body.

BRIEF DESCRIPTION OF THE DRAWINGS

The invention will be described in more detail hereinafter by means of the embodiments with reference to the drawings, in which:

FIG. 1A is a front view of a seat belt guide body;

FIG. 1B is a front view of an embodiment of a seat belt guide wherein a sliding shell has been assembled with the guide body of FIG. 1A;

FIG. 4 is a schematic view of a flexing diagonal that occurs during seat belt extraction or retraction.

DETAILED DESCRIPTION OF THE INVENTION

Figure 2:
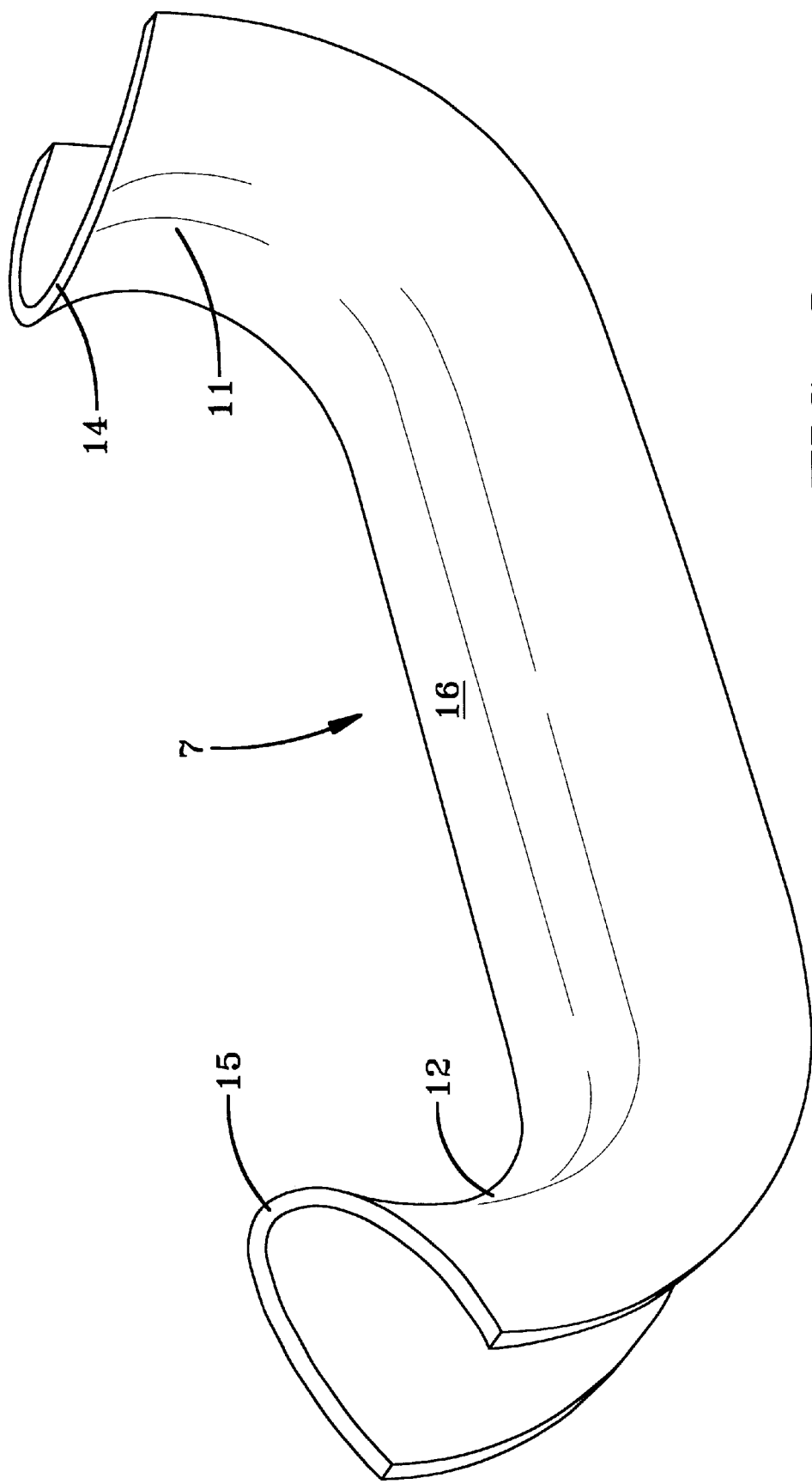
FIG. 2 is a perspective view of an embodiment of a sliding shell.

An exemplary metallic seat belt guide body 1 is shown in FIG. 1A. Provided on the metallic guide body is a flexing bar 3. The flexing bar 3 is laterally connected via two flexing bar carriers 5, 6 to an anchoring plate 17. The flexing bar and two flexing bar carriers cooperate with the anchoring plate to define a webbing guide aperture 10. As a through-hole for a screw connection, a bearing point 2 can be connected to a vehicle structure, for example in the region of a B-column of the vehicle. The bearing point is formed in the anchoring plate 17 of the guide body 1.

Figure 3:
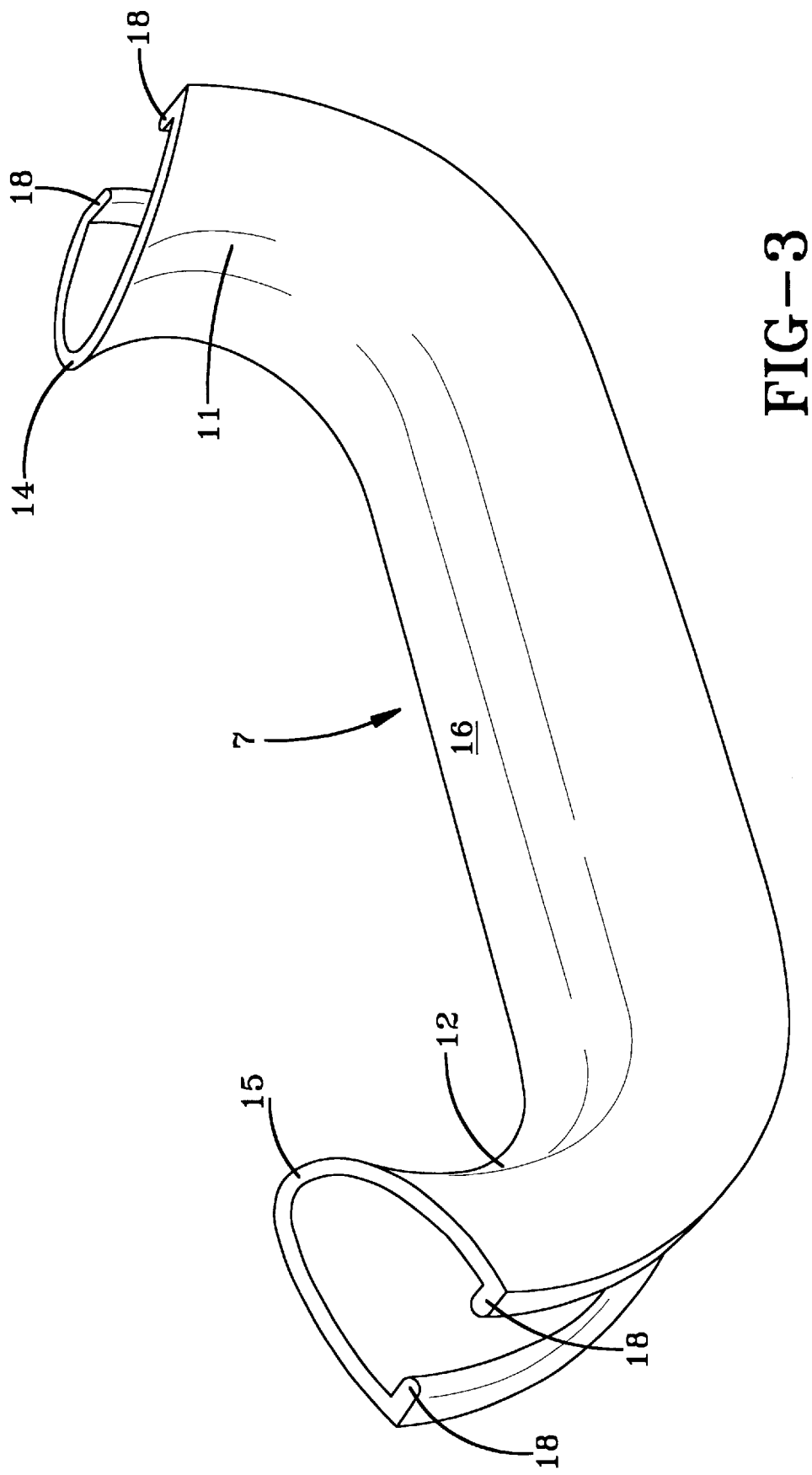
FIG. 3 shows a further embodiment of the sliding shell which is used in the embodiment in FIG. 1.

With reference to FIG. 1B a belt webbing guide face 16 is formed on the flexing bar 3 by a sliding shell 7 located in the region of the belt webbing guide aperture 10. The sliding shell, shown in perspective in FIGS. 2 and 3, is preferably a plastic clip. Suitable plastic materials for the sliding shell are polyacetal plastics, in particular polyoxymethylene (POM). Other low-friction plastic materials can also be used, for example based on tetrafluorethylene and similar materials. If necessary, lubricating additives such as talcum or semi-fluorinated alkanes and similar materials can be mixed with the sliding shell material.

The embodiments of sliding shells 7 shown in FIGS. 2 and 3 are clip shells that can be placed, with an interlocking fit, on the guide body 1 as shown in FIG. 1B. In this process the shell encloses the flexing bar 3. The flexing bar 3 of the guide body can have a C-shaped cross-section that is complementary to the interior surface of the sliding shell. The sliding shell 7 has a belt webbing guide face 16 located in the belt guide aperture 10 over which a seat belt webbing 4 (FIG. 4) is guided and deflected. As shown in FIGS. 2 and 3, the sliding shell 7 has a substantially U-shaped or C-shaped cross-section. When clipped onto the guide body 1, the inner face of the sliding shell has an interlocking fit with the guide body, substantially with its entire contour on the faces of the flexing bar 3 and in the region of the transition points 8, 9 between the flexing bar carriers 5, 6 and the flexing bar 3. In particular, the contour of the inner face of the sliding shell 7 corresponds to the outer surfaces of the flexing bar 3 and the outer surface on the rounded, in particular circular, rounded transition points 8, 9. The sliding shell also preferably extends over curved regions of the flexing bar carriers 5, 6 or the transition points 8, 9, these curved regions extending vertically with respect to the flexing bar 3. The faces of the sliding shell defining the lateral limitations of the belt webbing guide aperture 10 are provided on the domed shell parts 11, 12.

In the embodiments shown, the ends of the sliding shell extend as flanged shell ends 14, 15 over the domed shell parts 11, 12. The flanged shell ends 14, 15 come to be located in the regions of the flexing bar carriers 5, 6 that extend towards anchoring plate 17.

In the embodiment shown in FIG. 3, inwardly oriented clip-over edges 18 are provided on the sliding shell 7. The clip-over edges lie with interlocking fit behind the outer edge or a corresponding shaping of the guide profile on the flexing bar 3, the bent transition points and the flexing bar carriers 5, 6 of the metallic guide body. Further improvement of the attachment of the sliding shell 7 on the guide body 1 is thus achieved.

By means of the thin-walled sliding shell 7, which is formed, as described hereinbefore, as a clip-on shell, a low-friction belt webbing guide face 16 is achieved on the flexing bar 3. This low-friction belt webbing guide face is continued in the domed lateral shell parts 11, 12. These form, as already explained, the lateral limitation of the belt webbing guide aperture 10. This produces an ideal sliding surface without any friction joints or friction angle contours. The actual flexing function in the belt webbing takes place on a flexing diagonal 19 (FIG. 4) during belt extraction and belt retraction. The length of the flexing diagonal is larger than the width of the belt webbing 4, as can be seen in FIG. 4. With a belt webbing extraction angle of about 30°, as shown schematically in FIG. 4, the length of the flexing diagonal is about 52 to 55 mm when the width of the belt webbing is 48 mm. In the region of this flexing diagonal, it is necessary to achieve the low friction in the belt webbing guide face on the flexing bar 3 and in the domed shell parts in which the longitudinal edges of the seat belt webbing are guided during oblique extraction. With conventional vehicle types there is a solid angle position of the seat belt webbing of about 45°×45°×45° and therefore the described widening of the webbing region (flexing diagonal) which must be guided with low friction on the guide on the belt webbing guide face.

Preferably, the guide body 1 is deformable when there is a preselected load emanating from the belt webbing, for example in the event of a crash, wherein the flexing bar bends substantially symmetrically with respect to the anchoring hole, as described in DE 100 11 725.2. When there is a deformation of this type of guide body, the sliding shell is displaced from the guide body 1. The sliding shell therefore has no load bearing function in the event of a crash. This function is adopted by the guide body alone. The sliding shell 7 can optionally be pulled off the guide body 1 when the seat belt is tightened or on subsequent passing through of the belt webbing during the load-limited forward displacement of the vehicle occupant.

Due to the homogeneous bending of the flexing bar, optionally achieved by corresponding dimensioning of the flexing bar carriers 5, 6, a trough is formed in the region of the flexing bar 3, as a result of which the necessary guide security is achieved in the event of a crash, even with reduced overall size of the seat belt guide. The webbing 4 is then guided in the trough in the deformed flexing bar 3. The belt webbing is prevented from slipping from the deformed flexing bar 3 and the guide is prevented from tilting around the bearing point 2.

The sliding properties in the region of the belt webbing guide face 16 can be improved by a textured design, in particular for a polyester belt webbing fabric. This textured design can be specially adapted to the texture of the course of the warp of the belt webbing 4. A further stabilizing effect of the textured design can be achieved by a plastic chroming. Different grained pattern textures can be selected depending on the seat belt webbing used in each case.

While exemplary embodiments of the invention have been disclosed and described in detail herein, it should be understood that this invention is in no sense limited thereby and its scope is to be determined by that of the appended claims.

I claim:

1. A seat belt guide comprising a bearing point for the pivotal mounting of a anchoring plate on a vehicle structure, a flexing bar for guiding a belt webbing, two flexing bar carriers connect the flexing bar and anchoring plate and cooperate with the flexing bar and the anchoring plate to define a webbing guide aperture, two transition points laterally border the belt webbing guide aperture, and a sliding shell having a substantially uniform wall thickness is made of low-friction material for receiving forces occurring during normal operation is attached with an interlocking fit on the belt webbing guide face of the flexing bar and over the two transition points, the sliding shell is attached to the flexing bar in a manner that results in the sliding shell being released upon deformation of the flexing bar, the sliding shell has a low friction belt webbing guide face in the belt webbing guide aperture, wherein the sliding shell has a wall thickness of about 0.4 mm to 0.6 mm.

2. The seat belt guide according to claim 1, wherein the sliding shell is a plastic clip.

3. The seat belt guide according to claim 1 wherein the sliding shell comprises a polyacetal plastic material.

4. The seat belt guide according to claim 1 wherein the sliding shell comprises polyoxymethylene.

5. The seat belt guide according to claim 1 wherein the sliding shell has two lateral shell ends that project beyond the two rounded regions of the transition points.

6. The seat belt guide according to claim 1 wherein the sliding shell has two lateral shell ends that project beyond the flexing bar carriers.

7. The seat belt guide according to claim 1 wherein lubricating additives are mixed into the sliding shell material.

8. The seat belt guide according to claim 1 wherein the sliding shell has a substantially U-shaped profile.

9. The seat belt guide according to claim 1 wherein the sliding shell has a substantially C-shaped profile.

10. The seat belt guide according to claim 1 further comprising clip-over edges that are bent inwards provided on the longitudinal edges of the sliding shell.

11. The seat belt guide according to claim 1 wherein the guide body can be deformed when there is a preselected load from the belt webbing and the flexing bar bends substantially symmetrically with respect to a bearing point.

* * * * *